US011111981B2

(12) United States Patent
Henderickx

(10) Patent No.: US 11,111,981 B2
(45) Date of Patent: Sep. 7, 2021

(54) HEAT SHRINKABLE DIRT SHIELD

(71) Applicant: DRiV Automotive Inc., Lake Forest, IL (US)

(72) Inventor: Jonas Henderickx, Beringen (BE)

(73) Assignee: DRiV Automotive Inc., Lake Forest, IL (US)

( * ) Notice: Subject to any disclaimer, the term of this patent is extended or adjusted under 35 U.S.C. 154(b) by 92 days.

(21) Appl. No.: 16/655,458

(22) Filed: Oct. 17, 2019

(65) Prior Publication Data

US 2021/0115995 A1 Apr. 22, 2021

(51) Int. Cl.
*F16F 9/38* (2006.01)

(52) U.S. Cl.
CPC ........ *F16F 9/38* (2013.01); *F16F 2230/0023* (2013.01)

(58) Field of Classification Search
CPC .. F16F 9/38; F16F 2226/04; F16F 2230/0023; F16F 2224/02; B29C 49/48; B29C 2049/2427; B29D 35/12; B60G 15/063; B60G 2204/45021; B60G 15/065; B60G 2202/312; B60G 2202/32; B60G 2204/1242; B60G 2204/40
See application file for complete search history.

(56) References Cited

U.S. PATENT DOCUMENTS

| | | | |
|---|---|---|---|
| 4,092,382 A * | 5/1978 | Heckman | B65B 53/02 264/493 |
| 4,167,991 A | 9/1979 | Karklins et al. | |
| 4,199,855 A | 4/1980 | McClellan | |
| 4,852,891 A * | 8/1989 | Sugiura | B29C 49/063 277/636 |
| 5,954,168 A * | 9/1999 | Nakatani | F16F 9/38 188/322.12 |
| 6,770,237 B2 | 8/2004 | Nakamura | |
| 7,188,827 B2 * | 3/2007 | Thomae | B60G 11/27 267/64.21 |
| 8,403,116 B2 | 3/2013 | Handke et al. | |
| 9,352,538 B1 * | 5/2016 | Olason | B29C 53/586 |

(Continued)

FOREIGN PATENT DOCUMENTS

| | | | |
|---|---|---|---|
| CN | 201437834 U | * | 4/2010 |
| JP | 4556797 | | 7/2010 |
| JP | 6324291 | | 4/2018 |

OTHER PUBLICATIONS

Translation of Chinese Patent No. CN 201437834 obtained from website: https://worldwide.espacenet.com on Mar. 9, 2021.*

*Primary Examiner* — Pamela Rodriguez
(74) *Attorney, Agent, or Firm* — Burris Law, PLLC

(57) ABSTRACT

A method of forming a dirt shield on a shock absorber includes positioning a mold over a portion of the shock absorber, heat shrinking a sleeve onto the mold, and removing the mold from the portion of the shock absorber such that the sleeve after heat shrinking remains on the shock absorber and forms the dirt shield. The shock absorber includes a piston rod, a mount rigidly attached to the piston rod, and a bushing secured to the mount. Prior to heat shrinking the sleeve, the sleeve slides over the bushing, and after heat shrinking the sleeve the bushing has an outer dimension greater than an inner dimension of the dirt shield. Also, a plurality of sleeves having the same inner dimension is used to form a plurality of dirt shields having different inner dimensions.

20 Claims, 8 Drawing Sheets

(56) References Cited

U.S. PATENT DOCUMENTS

Figure 1:
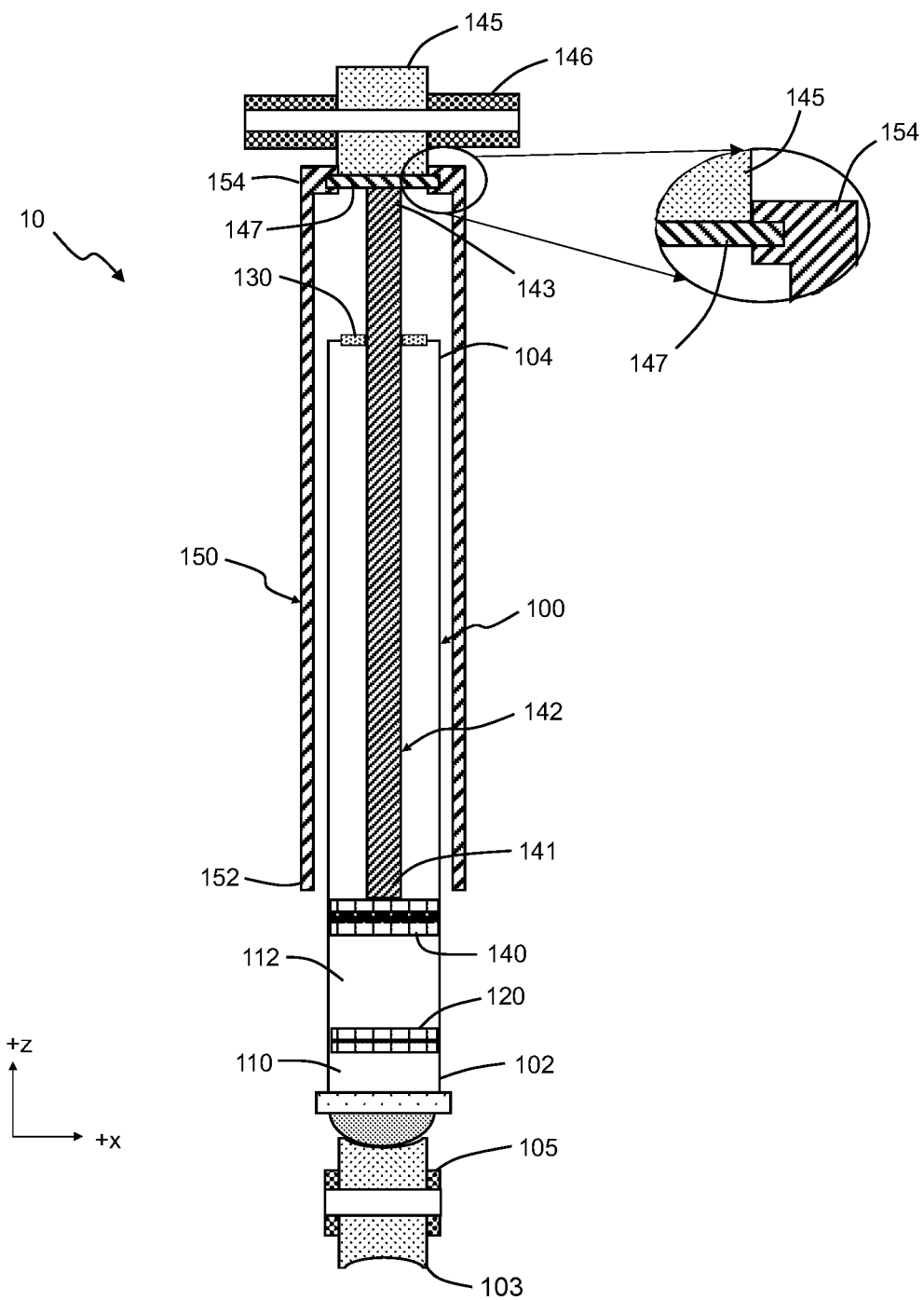

| | | |
|---|---|---|
| 9,611,913 B2 | 4/2017 | Nagai et al. |
| 10,203,015 B2 | 2/2019 | Ando et al. |
| 2005/0019514 A1* | 1/2005 | Takegawa .................. C08J 5/18 |
| | | 428/34.9 |

* cited by examiner

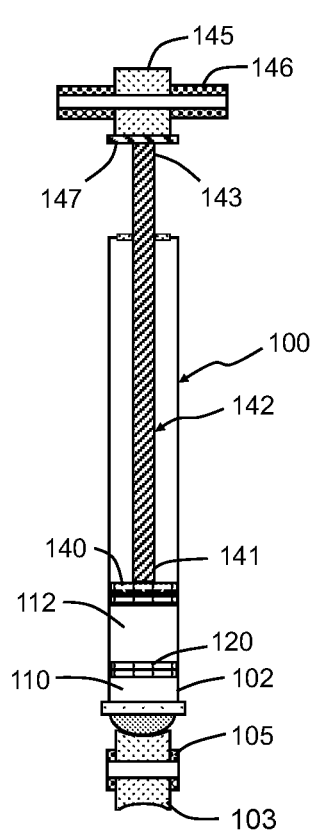
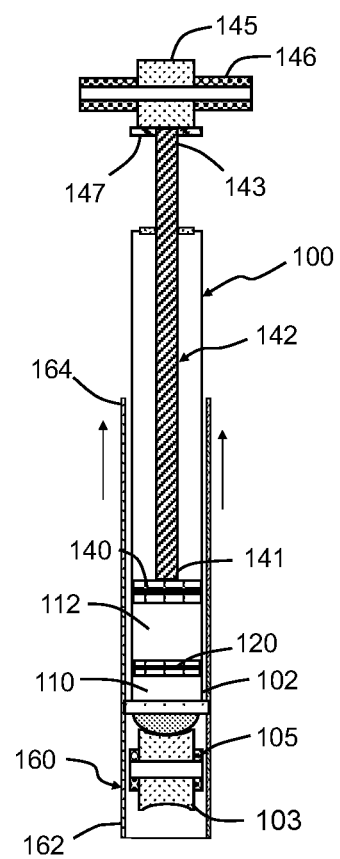
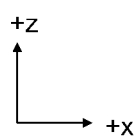
FIG. 2A
FIG. 2B

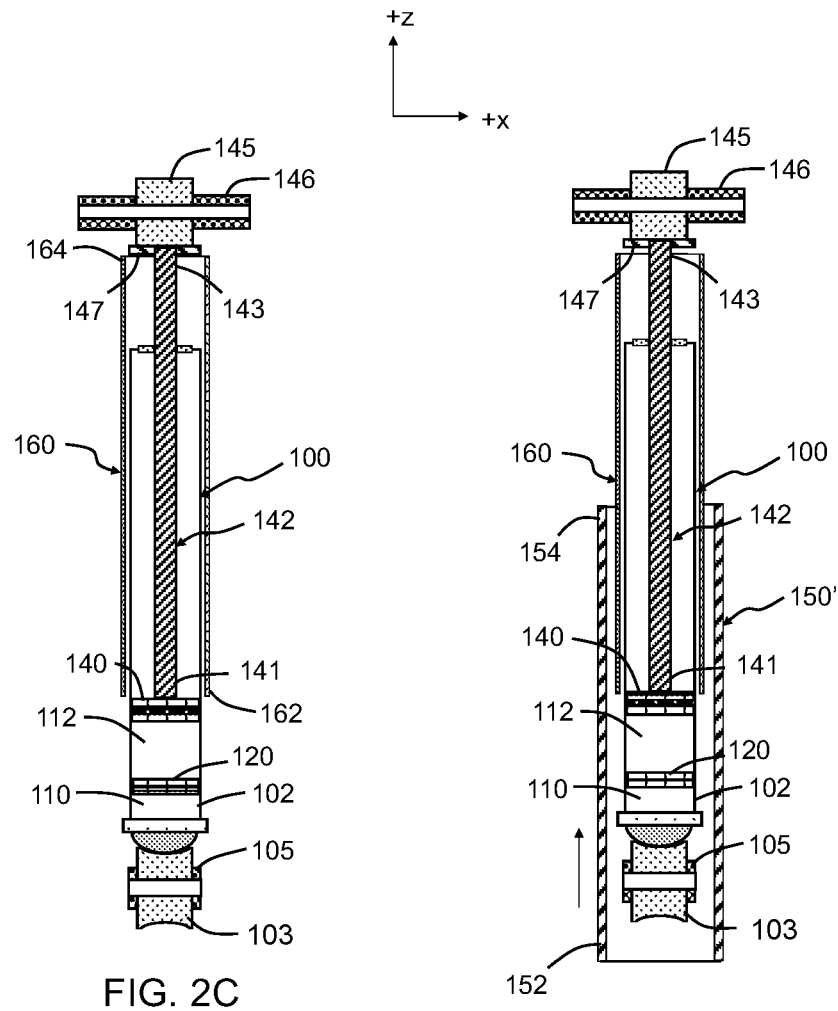

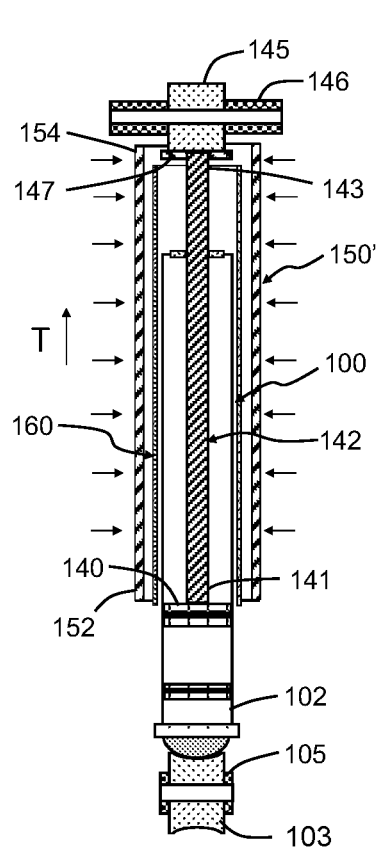 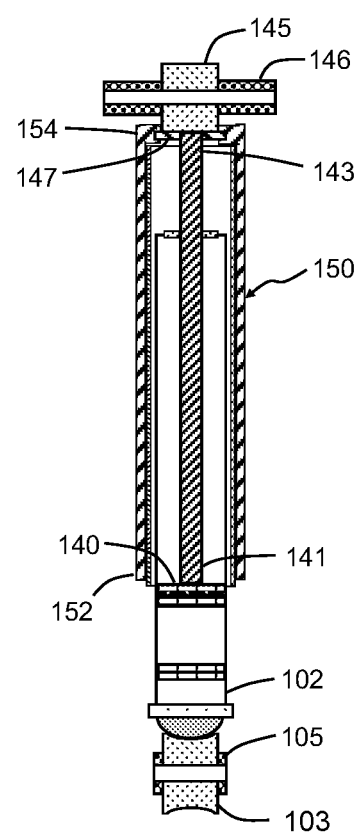 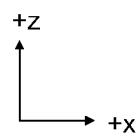
FIG. 2E
FIG. 2F

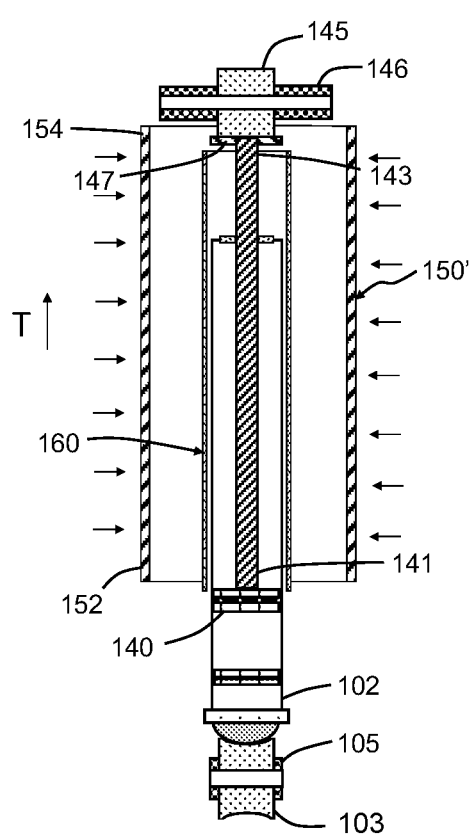
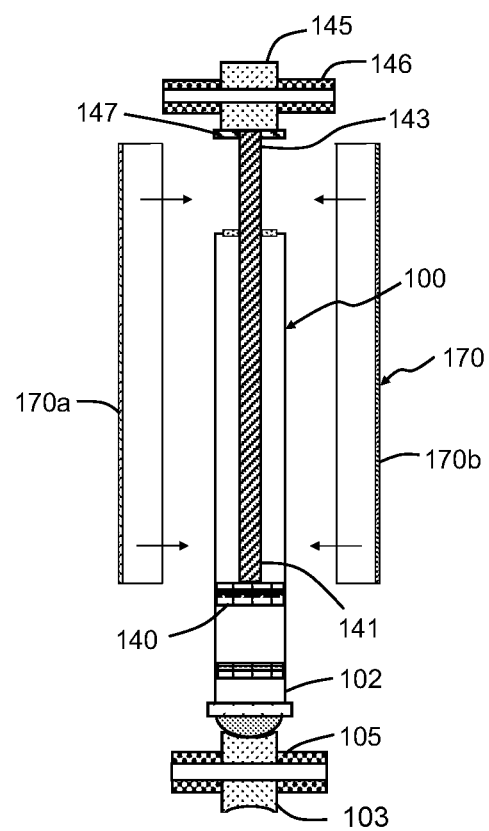
FIG. 3B
FIG. 4A
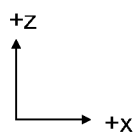

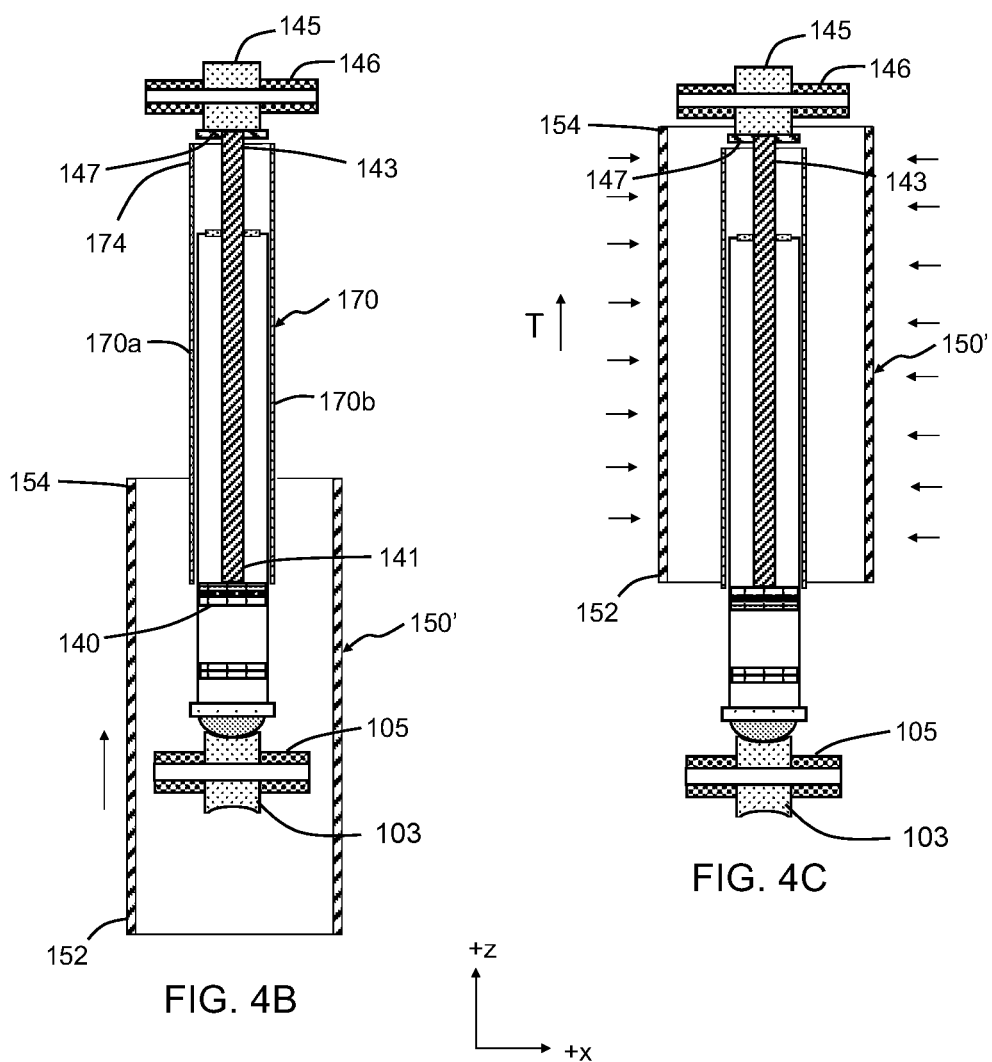

HEAT SHRINKABLE DIRT SHIELD

FIELD

The present disclosure relates to shock absorbers and particularly to shock absorbers with dirt shields.

BACKGROUND

The statements in this section merely provide background information related to the present disclosure and may not constitute prior art.

Shock absorbers for vehicles such as motorcycles, automobiles and trucks, among others, typically have a piston-cylinder assembly with a cylinder containing oil and/or gas, and a piston with a piston rod disposed in the cylinder. The cylinder has one end connected to a cylinder mount with a bushing disposed therein and another end through which the piston rod extends. One end of the piston rod is connected to the piston and another end is connected to a piston rod mount with a bushing disposed therein. The cylinder mount is connected to a body or frame of the vehicle (also known as a "spring mass") and the piston rod mount is connected to a suspension system of the vehicle (also known as an "unsprung mass"). In the alternative, the cylinder mount is connected to the unspring mass of the vehicle and the piston rod is connected to the sprung mass of the vehicle.

During operation or use of the shock absorber, the piston and piston rod slide within the cylinder such that damping force is created by the restricted flow of fluid through passages and valving in the piston. Also, the piston rod slides through a seal that reduces or prevents fluid from leaking from the cylinder and a shield or cover (referred to herein as a "dirt shield") is used to protect the piston rod and seal from debris, dirt, water, salt and mud. The dirt shield also reduces or prevents objects such as rocks from impacting and damaging the piston rod positioned and/or sliding outside the cylinder. Such dirt shields are typically connected to the piston rod using an injection molding process that uses a set of dies for each type, model and/or size of shock absorber being manufactured.

The present disclosure addresses the issues of manufacturing dirt shields for shock absorbers among other issues related to the manufacture of shock absorbers.

SUMMARY

This section provides a general summary of the disclosure and is not a comprehensive disclosure of its full scope or all of its features.

In one form of the present disclosure a method of forming a dirt shield on a shock absorber includes positioning a mold over a portion of the shock absorber, heat shrinking a sleeve onto the mold and the shock absorber, and removing the mold from the portion of the shock absorber such that the sleeve after heat shrinking remains on the shock absorber and forms the dirt shield. In at least one variation, the mold is positioned over a piston rod of the shock absorber and the sleeve after heating shrinking is secured to a mount of the shock absorber. In one variation, the method further includes sliding the sleeve over a bushing prior to heat shrinking the sleeve and the bushing has an outer dimension greater than an inner dimension of the heat shrunk sleeve (i.e., the dirt shield). That is, the sleeve has an inner dimension larger than an outer dimension of the mount and/or the bushing secured to the mount and the dirt shield has an inner dimension less than the outer dimension of the mount and/or the bushing. In another variation of the present disclosure, the mold is a multi-component mold formed from a plurality of parts or components that around assembled around the portion of the shock absorber and the assembled mold has an inner dimension less than an outer dimension of the mount and/or the bushing. In some variations of the present disclosure, the sleeve is formed from a material selected from an elastomer, fluorinated ethylene propylene, polyolefin, polyvinylchloride, polyvinylidene fluoride, silicone rubber, polytetrafluoroethylene, and combinations thereof.

In another form of the present disclosure, a method of forming dirt shields on a plurality of shock absorbers includes: (a) heat shrinking a sleeve onto a mold positioned over a shock absorber such that the sleeve forms a dirt shield that is secured to the mold and a piston rod mount of the shock absorber; and (b) removing the mold from being positioned over the shock absorber such that the dirt shield is secured to the piston rod mount and extends from the piston rod mount towards a cylinder mount of the shock absorber. Also, the method includes repeating steps (a) and (b) for at least one additional shock absorber. In some variations, an outer dimension of a cylinder, cylinder mount and/or piston rod mount of each of the plurality of shock absorbers is the same, while in other variations, an outer dimension of a cylinder, cylinder mount and/or piston rod mount of at least two shock absorbers is different and an inner dimension of the sleeves before heat shrinking is the same. That is, sleeves of the same size are heat shrunk to form dirt shields on shock absorbers having a range of sizes (i.e., at least two sizes).

In at least one variation of the present disclosure, the piston rod mount of each of the plurality of shock absorbers has a flange and heating shrinking the sleeve secures the sleeve onto the flange. In one variation, the method includes shock absorbers with at least two of the flanges having a different outer dimension and the sleeves prior to heat shrinking and being secured to the at least two flanges have the same inner dimension. In another variation, the mold is a multi-component mold assembled into position over the shock absorber before heat shrinking of the sleeve. In such a variation, the mold is disassembled and removed from over the shock absorber after heat shrinking of the sleeve.

In still another form of the present disclosure, a shock absorber is manufactured by a method that includes assembling a cylinder with a cylinder mount and a piston rod with a piston rod mount to form a cylinder-piston shock absorber assembly, positioning a mold over at least a portion of the piston rod, positioning a sleeve over the mold, and heat shrinking and securing the sleeve to the piston rod mount such that a dirt shield is formed on the shock absorber. The method further includes removing the mold from being positioned over the piston rod and from within the dirt shield. In some variations of the present disclosure, the method includes assembling a plurality of cylinders with cylinder mounts and a plurality of piston rods with piston rod mounts to form a plurality of cylinder-piston shock absorber assemblies. In such variations, a plurality of heat shrinkable sleeves are assembled and the method includes: (a) positioning a mold over a piston rod for one of the cylinder-piston shock absorber assemblies; (b) positioning one of the plurality of sleeves over the mold; (c) heat shrinking the sleeve onto the piston rod mount; (d) and removing the mold from over the piston rod. Also, steps (a) through (d) are repeated for each of the remaining plurality of cylinder-piston shock absorber assemblies.

In at least one variation of the present disclosure, the method includes heat shrinking the sleeves onto piston rod mounts having different outer dimensions. In another variation, the method includes heat shrinking the sleeves onto piston rod mounts having different outer dimensions and an inner dimension of each of the sleeves prior to heat shrinking is the same.

Further areas of applicability will become apparent from the description provided herein. It should be understood that the description and specific examples are intended for purposes of illustration only and are not intended to limit the scope of the present disclosure.

DRAWINGS

Figure 2G:
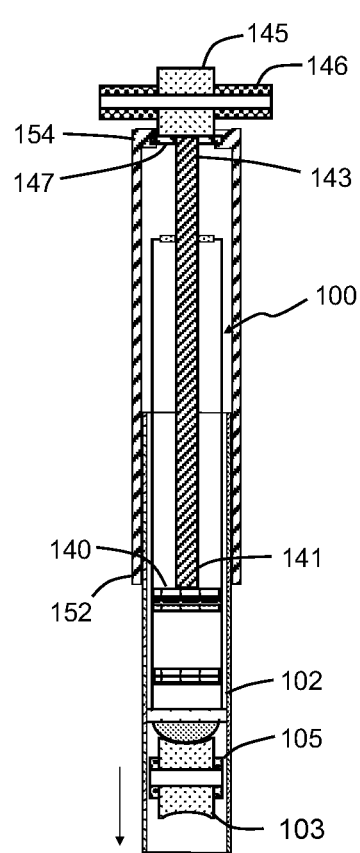
Figure 3A:
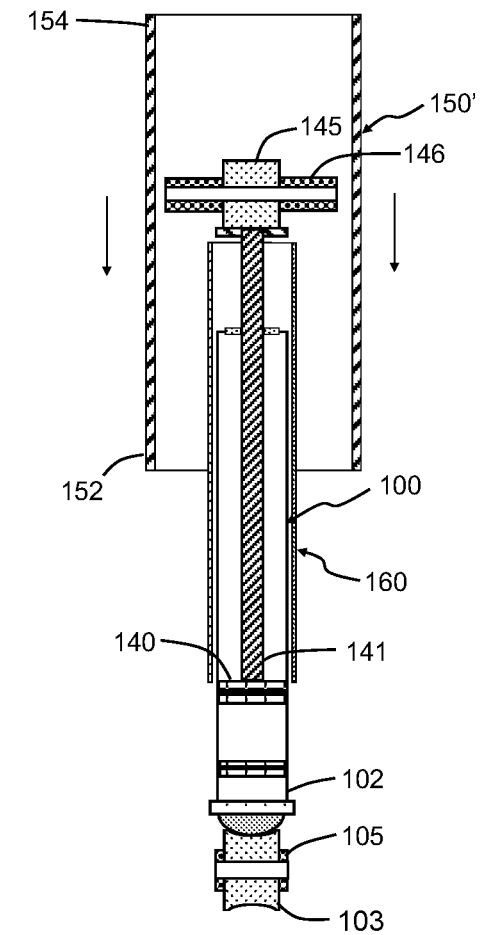
Figures 4D, 4E:
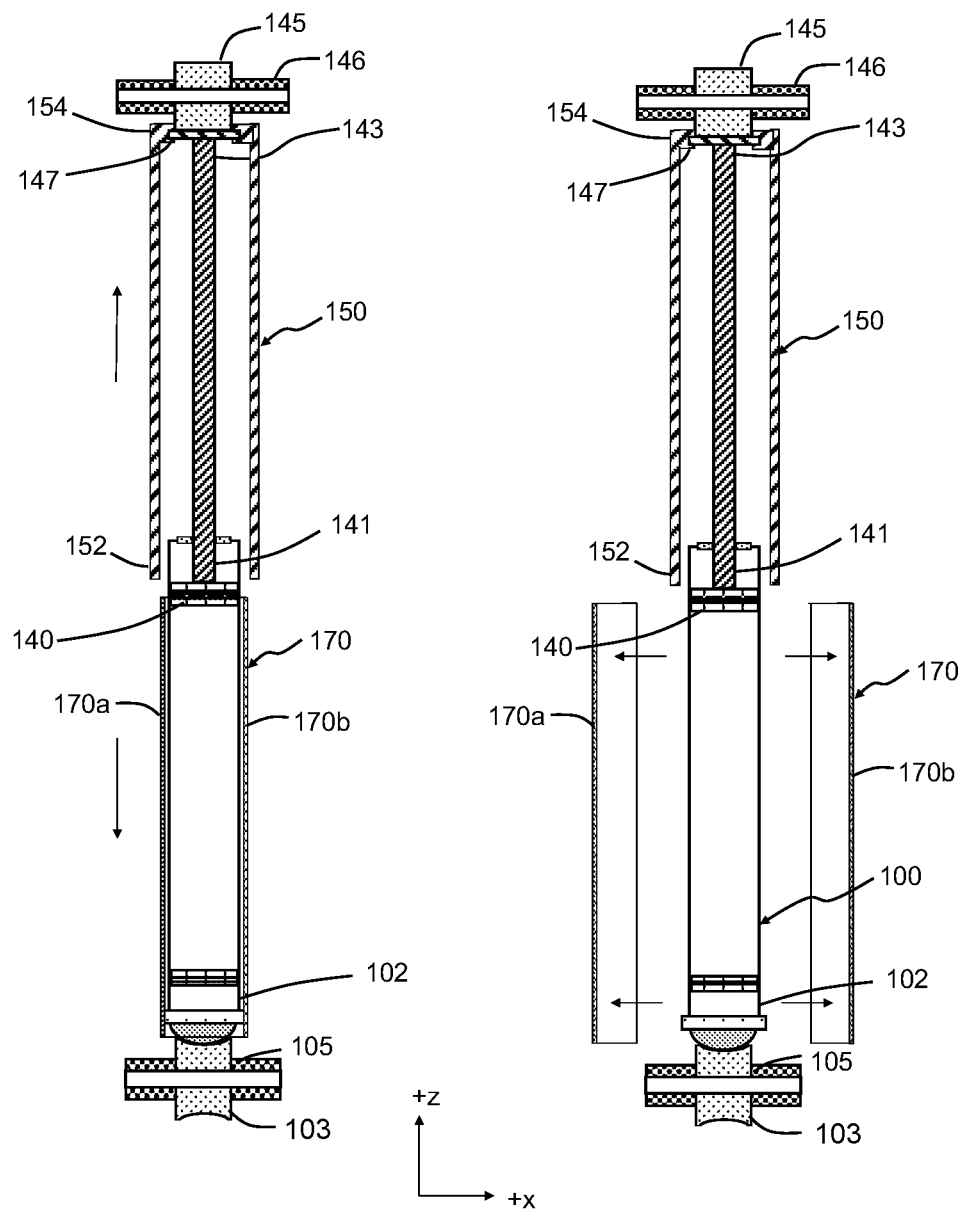

In order that the disclosure may be well understood, there will now be described various forms thereof, given by way of example, reference being made to the accompanying drawings, in which:

FIG. 1 is a cross-sectional view of a shock absorber with a dirt shield according to the teachings of the present disclosure;

FIGS. 2A-2G show a series of steps for manufacturing a dirt shield for a shock absorber according to one form of the present disclosure where: FIG. 2A shows a cross-section of a shock absorber without a dirt shield; FIG. 2B shows a mold being disposed over the shock absorber in FIG. 2B; FIG. 2C shows the mold in FIG. 2B installed on the shock absorber; FIG. 2D shows a heat shrinkable sleeve being disposed over the mold in FIG. 2C; FIG. 2E shows the heat shrinkable sleeve installed on the mold in FIG. 2C and heat being applied to the heat shrinkable sleeve; FIG. 2F shows the heat shrinkable sleeve heat shrunk onto the mold in FIG. 2C; and FIG. 2G shows the mold in FIG. 2C being removed from the shock absorber in FIG. 2A;

FIGS. 3A-3B show two steps for manufacturing a dirt shield for a shock absorber according to another form of the present disclosure where: FIG. 3A shows a heat shrinkable sleeve being disposed over a bushing on a piston rod of the shock absorber and a mold; and FIG. 3B shows heat being applied to the heat shrinkable sleeve installed on the mold in FIG. 3A; and FIGS. 4A-4E show steps for manufacturing a dirt shield on a shock absorber according to yet another form of the present disclosure where: FIG. 4A shows a multi-component being disposed onto the shock absorber; FIG. 4B shows a heat shrinkable sleeve being disposed over a bushing and the mold in FIG. 4A; FIG. 4C shows heat being applied to the heat shrinkable sleeve installed on the mold in FIG. 4B; FIG. 4D shows removal of the mold from within the heat shrinkable sleeve; and FIG. 4E shows the mold being removed from the shock absorber.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features. Examples are provided to fully convey the scope of the disclosure to those who are skilled in the art. Numerous specific details are set forth such as types of specific components, devices, and methods, to provide a thorough understanding of variations of the present disclosure. It will be apparent to those skilled in the art that specific details need not be employed and that the examples provided herein, may include alternative embodiments and are not intended to limit the scope of the disclosure. In some examples, well-known processes, well-known device structures, and well-known technologies are not described in detail.

Referring to FIG. 1, a shock absorber 10 with a dirt shield 150 according to the teachings of the present disclosure is shown. The shock absorber 10 includes a cylinder 100 with a first end portion 102 and a second end portion 104. Connected to the first end portion 102 is a cylinder mount 103 and a first bushing 105 is connected to the cylinder mount 103. A floating piston 120 and a piston 140 having a rod 142 (also referred to herein as a "piston rod") are disposed within the cylinder 100. A gas reservoir 110 is positioned or formed within the cylinder 100 between the first end portion 102 and the floating piston 120, and an oil reservoir 112 is positioned or formed within the cylinder 100 between the floating piston 120 and the piston 140. The piston rod 142 has a first end 141 connected to the piston 140 and a second end 143 connected to a piston rod mount 145. A second bushing 146 is connected to the piston rod mount 145 and the rod 142 extends through a seal 130 at the second end portion 104 of the cylinder 100.

The dirt shield 150 has a first end portion 152 and a second end portion 154 oppositely disposed from the first end portion 152 along a length (z direction) of the shock absorber 10. In one variation of the present disclosure, the first end portion 152 of the dirt shield 150 is not connected to the cylinder 100 and moves along the length of the shock absorber 10 during movement of the piston rod 142. In another variation of the present disclosure, the first end portion 152 of the dirt shield 150 is connected to the cylinder 100 and yet moves (e.g., slides) along the length of the shock absorber 10 during movement of the piston rod 142. The second end portion 154 of the dirt shield 150 is connected to the second end portion 143 of the rod 142, for example, in at least one variation the second end portion 154 of the dirt shield 150 is connected to the piston rod mount 145. Accordingly, the dirt shield 150 protects the rod 142 from debris, dirt, water, salt, and mud, and objects such as rocks. In one variation of the present disclosure, a flange 147 (e.g., a washer) is connected to the second end portion 143 and/or the piston rod mount 145 of the rod 142 and the second end portion 154 of the dirt shield 150 is connected to the flange 147. As discussed in greater detail below, the dirt shield 150 is formed by heat shrinking a heat shrinkable sleeve onto the second end portion 143 of the rod 142, e.g., onto the flange 147 as depicted in FIG. 1.

Referring now to FIGS. 2A-2F, as series of steps for manufacturing or forming the dirt shield 150 on the shock absorber 10 is shown. FIG. 2A shows the shock absorber 10 without the dirt shield 150 and FIG. 2B shows the shock absorber 10 in FIG. 2A with a mold 160 (i.e., a dirt shield mold) being disposed over the cylinder 100. The mold includes a first end portion 162 and a second end portion 164, and in one variation of the present disclosure, the mold 160 slides over the cylinder mount 103 and the first bushing 105 towards the piston rod mount 145. Accordingly, and as shown in FIG. 2B, it should be understood that at an inner dimension (e.g., an inner diameter) of the mold 160 is greater than an outer dimension (e.g., a width (x direction)) of the cylinder mount 103 and the first bushing 105. Stated differently, the mold 160 is dimensioned to slide over the cylinder mount 103 and the first bushing 105 as shown in FIG. 2B.

Referring now to FIG. 2C, the mold 160 is displaced or moved upwardly (+z direction) until the second end portion 164 is positioned proximate to the second end portion 143 of the rod 142. In variations where the flange 147 is connected to the second end portion 143 of the rod 142 and/or the piston rod mount 145, the second end portion 164 of the mold 160 is positioned proximate to the flange 147 as shown in the figure.

Referring now to FIG. 2D, a heat shrinkable sleeve 150' before being heat shrunk is disposed over the cylinder 100. In at least one variation of the present disclosure, the heat shrinkable sleeve 150' slides over the cylinder mount 103, the first bushing 105 and the mold 160 towards the piston rod mount 145 and the second bushing 146. Accordingly, it should be understood that an inner dimension (e.g., an inner diameter) of the heat shrinkable sleeve 150' is greater than an outer dimension of the cylinder mount 103, the first bushing 105 and the mold 160. Stated differently, the heat shrinkable sleeve 150' is dimensioned to slide over the cylinder mount 103, the first bushing 105 and the mold 160 as shown in FIG. 2D.

Referring now to FIG. 2E, the heat shrinkable sleeve 150' is displaced or moved upwardly (+z direction) until the second end portion 154 is positioned proximate to the second end portion 143 of the rod 142 and heat is applied to the heat shrinkable sleeve 150' such that its temperature T increases. In variations where the flange 147 is included, the second end portion 154 of the heat shrinkable sleeve 150' is positioned proximate to the flange 147 as shown in the figure. The temperature of the heat shrinkable sleeve 150' increases such that the heat shrinkable sleeve 150' shrinks and forms the dirt shield 150 connected to the second end portion 143 of the rod 142. In variations where the flange 147 is included, the second end portion 154 of heat shrinkable sleeve 150' shrinks onto the flange 147 as shown in the figure thereby connecting or attaching the dirt shield 150 to the flange 147 as shown in FIG. 2F.

Referring now to FIG. 2G, the mold 160 is removed from within the dirt shield 150 by sliding the mold 160 downwardly (−z direction) such that the shock absorber 10 with the dirt shield 150 shown in FIG. 1 is provided. It should be understood that the dirt shield 150 and/or the mold 160 are made or formed from materials that provide surfaces in contact with each other that allow the mold 160 to be removed from within the dirt shield 150 without the use of excessive force. In the alternative, or in addition to, one or more lubricants are used between the dirt shield 150 and the mold 160 that allow the mold 160 to be removed from within the dirt shield 150 without the use of excessive force. It should be understood that the amount of force used to remove the mold 160 from within the dirt shield 150 will depend on factors such as the design of the shock absorber 10, the size of the shock absorber 10 and the materials used for the dirt shield 150 and/or mold 160, among others. Accordingly, it should be understood that "excessive force" refers to a force that would be required, for example, to remove the mold 160 from within an outer sleeve that has been heat shrunk onto the mold 160 and the mold 160 with the heat shrunk sleeve are designed for and used as a single item or part.

It should also be understood that the heat shrinkable sleeve 150' is formed from a material that shrinks when heat is applied there to. For example, a sleeve with a desired final shape (e.g., a final or post-shrunk diameter) made from a thermoplastic material is cross-linked thereby creating a memory (also known as a shape-memory) in the sleeve. The sleeve is then heated above its crystalline melting point and expanded in diameter, for example by placing the sleeve in a vacuum. While the sleeve is in its expanded state, it is rapidly cooled and "frozen" in the expanded state. Then when the sleeve is heated again above its crystalline melting point it returns (i.e., shrinks) to its original or post-shrunk size/diameter. Non-limiting examples of thermoplastic materials used for heat shrinkable tubing include polyolefins, fluoropolymers, polyvinyl chloride (PVC), neoprene, and silicone elastomers, among others. Also, non-limiting examples of crystalline melting points for such thermoplastic polymers range from about 75° C. to about 200° C. It should also be understood that while the transverse cross sectional shape of the sleeve 150' and/or dirt shield 150, i.e., the shape of the sleeve 150' and/or dirt shield 150 on the x-y plane in the figures, is shown as circular, sleeves and/or molds with other shapes are within the scope of the present disclosure. Non-limiting examples of other transverse cross sectional shapes of the sleeve 150' and/or dirt shield 150 include shapes such as square, rectangular, hexagonal, and octagonal, among others.

While FIGS. 2A-2G show the heat shrinkable sleeve 150' being displaced or moved upwardly (+z direction) over the cylinder 100 and rod 142, it should be understood that the heat shrinkable sleeve 150' can be displaced and moved downwardly (−Z direction) over the piston rod mount 145 and the second bushing 146 as shown in FIGS. 3A and 3B. Particularly, in another form of the present disclosure the heat shrinkable sleeve 150' is disposed over the cylinder 100 by sliding the heat shrinkable sleeve 150' over the piston rod mount 145, the second bushing 146 and the mold 160 towards the cylinder mount 103 and the first bushing 105 (FIG. 3A). Accordingly, it should be appreciated that an inner dimension (e.g., an inner diameter) of the heat shrinkable sleeve 150' is greater than an outer dimension of the piston rod mount 145, the second bushing 146 and the mold 160. Stated differently, the heat shrinkable sleeve 150' is dimensioned to slide over the piston rod mount 145, the second bushing 146 and the mold 160. Also, the heat shrinkable sleeve 150' is displaced or moved downwardly (−z direction) until the second end portion 154 is positioned proximate to the second end portion 143 of the rod 142 (FIG. 3B) and heat is applied to the heat shrinkable sleeve 150' such that its temperature 'T' increases and the heat shrinkable sleeve 150' shrinks and is connected to the second end portion 143 of the rod 142 to form the dirt shield 150 (FIG. 1). In variations where the flange 147 is included, the second end portion 154 of the heat shrinkable sleeve 150' is positioned proximate to the flange 147 as shown in the figure and the second end portion 154 of the heat shrinkable sleeve 150' is shrunk onto the flange 147 as shown in FIG. 3B. Accordingly, the mold 160 can be disposed over the cylinder 100 and rod 142 via movement in one direction (+z or −z direction) and the heat shrinkable sleeve 150' can be disposed over the cylinder 100 and rod 142 (and the mold 160) via movement in another direction (−z or +z direction, respectively).

Referring now to FIGS. 4A-4E, in still another form of the present disclosure, a multi-component mold is used to form the dirt shield 150. For example, and as shown in FIG. 4A, a mold 170 comprising at least two components 170a and 170b is disposed or positioned adjacent the cylinder 100 and rod 142. The at least two components 170a and 170b are assembled together such that a second end portion 174 of the mold 170 is positioned proximate to the second end portion 143 of the rod 142 as shown in FIG. 4B. In variations where the flange 147 is connected to the second end portion 143 of the rod 142, the second end portion 174 of the mold 170 is positioned proximate to the flange 147 as shown in the figure. It should be understood that assembling the mold 170 from the at least two components 170a and 170b allows the mold 170 to have an inner dimension less than an outer dimension of a cylinder mount 103/first bushing 105 and/or a piston rod mount 145/second bushing 146 for a particular shock absorber and still be used to form a dirt shield 150 on the shock absorber.

Before, during or after the mold 170 is assembled and positioned proximate to the second end portion 143 of the rod 142, the heat shrinkable sleeve 150' is displaced or moved upwardly (+z direction) as shown in FIG. 4B, or downwardly as shown in FIG. 3A, until the second end portion 154 is positioned proximate to the second end portion 143 of the rod 142 and heat is applied to the heat shrinkable sleeve 150'. In variations where the flange 147 is included, the second end portion 154 of the heat shrinkable sleeve 150' is positioned proximate to the flange 147 as shown in In FIG. 4B. Heat is applied to the heat shrinkable sleeve 150' (FIG. 4C) such its temperature increases above its crystalline melting temperature and the heat shrinkable sleeve 150' shrinks and forms the dirt shield 150 connected to the second end portion 143 of the rod 142 (FIG. 1). In variations where the flange 147 is included, the second end portion 154 of the dirt shield 150 is shrunk onto the flange 147 as shown in the figure. After the dirt shield 150 is formed over the mold 170, the mold 170 is removed from within the mold 170 as shown in FIG. 4O, and the mold 170 is removed from the cylinder 100, e.g., removed in multiple pieces, as shown in FIG. 4E such that the shock absorber 10 with the dirt shield 150 is formed.

When an element or layer is referred to as being "on," "engaged to," "connected to" or "coupled to," another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in like fashion (e.g., "between" versus "directly between," "adjacent" versus "directly adjacent," etc.). As used herein, the term "and/or" includes any and all combinations of one or more of the associated listed items.

Although the terms first, second, third, etc. may be used to describe various elements, components, regions, layers and/or sections, these elements, components, regions, layers and/or sections, should not be limited by these terms. These terms may be only used to distinguish one element, component, region, layer and/or section, from another element, component, region, layer and/or section. Terms such as "first," "second," and other numerical terms when used herein do not imply a sequence or order unless clearly indicated by the context. Thus, a first element, component, region, layer or section, could be termed a second element, component, region, layer or section without departing from the teachings of the example forms. Furthermore, an element, component, region, layer or section may be termed a "second" element, component, region, layer or section, without the need for an element, component, region, layer or section termed a "first" element, component, region, layer or section.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above or below. The device may be otherwise oriented (rotated 90 degrees or at other orientations) and the spatially relative descriptors used herein interpreted accordingly.

As used herein, the phrase at least one of A, B, and C should be construed to mean a logical (A OR B OR C), using a non-exclusive logical OR, and should not be construed to mean "at least one of A, at least one of B, and at least one of C."

Unless otherwise expressly indicated, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

The terminology used herein is for the purpose of describing particular example forms only and is not intended to be limiting. The singular forms "a," "an," and "the" may be intended to include the plural forms as well, unless the context clearly indicates otherwise. The terms "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The description of the disclosure is merely exemplary in nature and, thus, examples that do not depart from the substance of the disclosure are intended to be within the scope of the disclosure. Such examples are not to be regarded as a departure from the spirit and scope of the disclosure. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method of forming a dirt shield on a shock absorber, the method comprising:
    positioning a mold over a portion of the shock absorber;
    heat shrinking a sleeve onto the mold and the shock absorber; and
    removing the mold from the portion of the shock absorber, wherein the sleeve after heat shrinking remains on the shock absorber and forms the dirt shield.

2. The method according to claim 1, wherein the mold is positioned over a piston rod of the shock absorber.

3. The method according to claim 1, wherein the sleeve after heating shrinking is secured to a piston rod mount of the shock absorber.

4. The method according to claim 1 further comprising sliding the sleeve over a bushing prior to heat shrinking the sleeve, wherein the bushing has an outer dimension greater than an inner dimension of the heat shrunk sleeve.

5. The method according to claim 4, wherein a piston rod mount comprises a flange and heating shrinking the sleeve secures the sleeve onto the flange.

6. The method according to claim 1, wherein the shock absorber comprises a piston rod, a piston rod mount rigidly attached to the piston rod, and a bushing secured to the piston rod mount, wherein the sleeve has an inner dimension larger than an outer dimension of the bushing secured to the piston rod mount.

7. The method according to claim 6, wherein the mold comprises a plurality of pieces.

8. The method according to claim 7, wherein the mold has an inner dimension less than the outer dimension of the bushing.

9. The method according to claim 1, wherein the sleeve is formed from a material selected from an elastomer, fluorinated ethylene propylene, polyolefin, polyvinylchloride, polyvinylidene fluoride, silicone rubber, polytetrafluoroethylene, and combinations thereof.

10. A method of forming dirt shields on a plurality of shock absorbers, the method comprising:
 a) heat shrinking a sleeve onto a mold positioned over a shock absorber such that the sleeve is secured to the mold and a piston rod mount of the shock absorber;
 b) removing the mold from being positioned over the shock absorber, wherein the heat shrunk sleeve is secured to the piston rod mount and extends from the piston rod mount towards a cylinder mount of the shock absorber; and
 c) repeating steps a) and b) for at least one additional shock absorber.

11. The method according to claim 10, wherein an outer dimension of the piston rod mount of each of the plurality of shock absorbers is the same.

12. The method according to claim 10, wherein an outer dimension of the piston rod mount of at least two shock absorbers is different and an inner dimension of all the sleeves before heat shrinking is equal such that sleeves of the same size are heat shrunk to form dirt shields on shock absorbers with different sizes.

13. The method according to claim 10, wherein the piston rod mount of each of the plurality of shock absorbers comprises a flange and heating shrinking the sleeve secures the polymer sleeve onto the flange.

14. The method according to claim 13, wherein at least two of the flanges have a different outer dimension and the sleeves prior to heat shrinking and being secured to the at least two of the flanges have the same inner dimension.

15. The method according to claim 10, wherein the mold is a multi-piece mold assembled into position over the shock absorber before heat shrinking of the sleeve and disassembled and removed from over the shock absorber after heat shrinking of the sleeve.

16. The method according to claim 10, wherein the sleeve is formed from a material selected from an elastomer, fluorinated ethylene propylene, polyolefin, polyvinylchloride, polyvinylidene fluoride, silicone rubber, polytetrafluoroethylene, viton and combinations thereof.

17. A shock absorber manufactured by a method comprising:
 assembling a cylinder with a cylinder mount and a piston rod with a piston rod mount to form a cylinder-piston shock absorber assembly;
 positioning a mold over at least a portion of the piston rod;
 positioning a sleeve in an expanded state over the mold; and
 heat shrinking and securing the sleeve to the piston rod mount.

18. The method according to claim 17 further comprising removing the mold from positioned over the piston rod.

19. The method according to claim 17 further comprising:
 a) assembling a plurality of cylinders with cylinder mounts and a plurality of piston rods with piston rod mounts to form a plurality of cylinder-piston shock absorber assemblies;
 b) assembling a plurality of sleeves;
 c) positioning the mold over a piston rod for one of the cylinder-piston shock absorber assemblies;
 d) positioning one of the plurality of sleeves over the mold;
 e) heat shrinking the sleeve onto the piston rod mount;
 f) removing the mold from over the piston rod; and
 g) repeating steps c) through f) for each of the remaining plurality of cylinder-piston shock absorber assemblies.

20. The method according to claim 19, wherein heat shrinking the sleeves onto the piston rod mounts comprises heat shrinking the sleeves onto piston rod mounts having different outer dimensions.

* * * * *